June 28, 1955 J. D. CZARNECKI 2,711,713
MECHANISM FOR REDUCING AND APPLYING
VISCOUS SUBSTANCES TO ARTICLES
Filed July 7, 1952 2 Sheets-Sheet 1

INVENTOR.
JOHN D. CZARNECKI
BY Charles H. Erne
Leland R. McCann
George W. Reiber
ATTORNEYS June 28, 1955
J. D. CZARNECKI
2,711,713
MECHANISM FOR REDUCING AND APPLYING
VISCOUS SUBSTANCES TO ARTICLES
Filed July 7, 1952
2 Sheets-Sheet 2
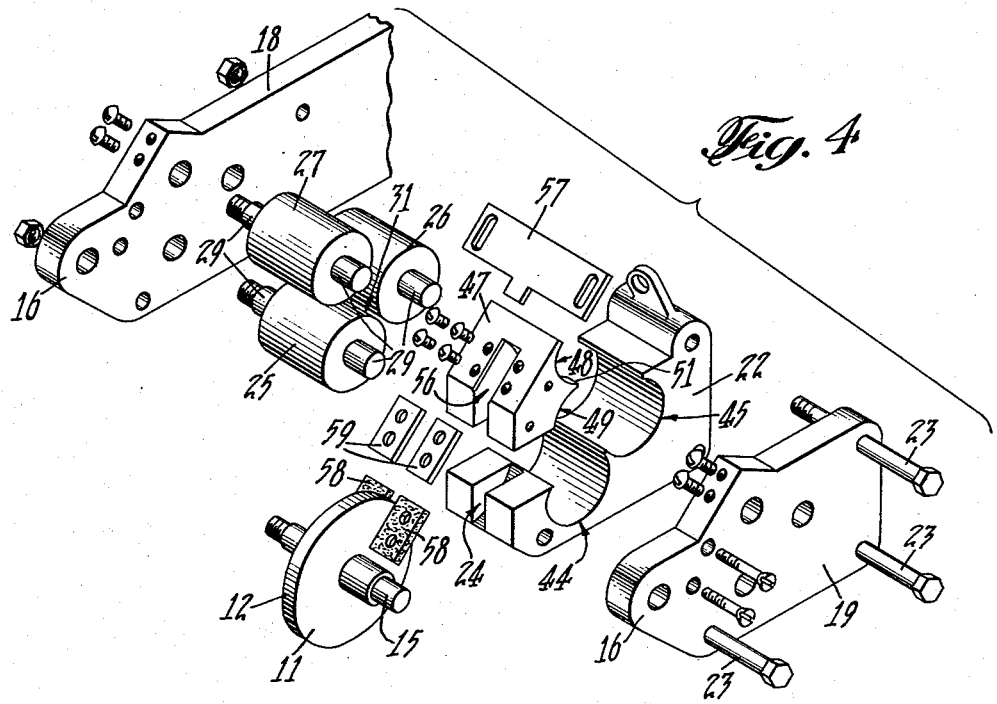
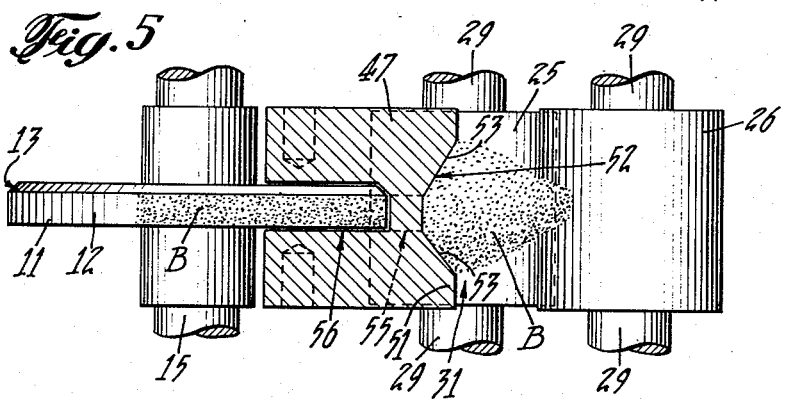
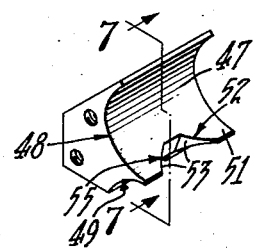
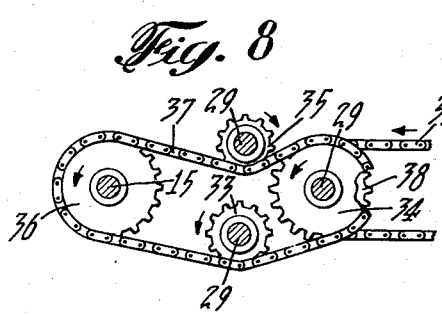
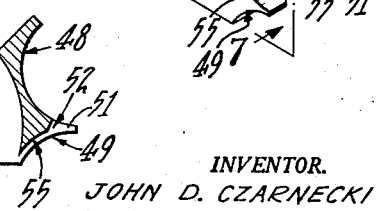
INVENTOR.
JOHN D. CZARNECKI
BY Charles H. Erne
Leland R. McCann
George W. Reiber
ATTORNEYS

United States Patent Office 2,711,713
Patented June 28, 1955

2,711,713

MECHANISM FOR REDUCING AND APPLYING VISCOUS SUBSTANCES TO ARTICLES

John D. Czarnecki, Oak Park, Ill., assignor to American Can Company, New York, N. Y., a corporation of New Jersey Application July 7, 1952, Serial No. 297,558

10 Claims. (Cl. 118—608)

The present invention relates to a mechanism for applying sealing compound and the like substances to articles and has particular reference to a milling device for reducing the viscosity and thixotropic characteristics of substances high in these properties so that they may be made more pliable and more readily applied to the articles.

In the manufacture of sheet metal containers or cans having side seams produced by the interfolding of hooks formed on marginal edge portions of the bodies of cans, a suitable bonding agent usually is applied to the seams to render them hermetic. For certain kinds of cans, it has been found desirable to utilize paste type cements as side seam bonding agents. However, such cements, usually are too viscous and thixotropic for application with a roller or rotating disc or other applicator, with the result that application of such substances to the seam or seam parts is a difficult feat. In order to use such substances, it has been found that if the substance is thoroughly worked or kneaded or milled its viscosity and thixotropy are temporarily reduced so that the substance may be readily handled in automatic machines.

The instant invention contemplates the provision of a milling and applying mechanism which will properly work or condition the substance into a reduced viscosity and thixotropic condition so that it may be readily applied to articles.

An object of the instant invention is the provision of a mechanism for applying sealing compounds and the like substances to articles wherein the substance is worked, kneaded or milled in such a manner as to reduce the viscosity and thixotropic characteristics of substances high in such properties so that they may be readily applied to articles by rollers, discs or other applicators.

Another object is the provision of such an applying mechanism wherein the quantity of such reduced substances supplied to an applicator may be controlled so that application of the substance to the articles may be effected uniformly.

Another object is the provision of such an applying mechanism wherein the substance to be worked is subjected to a continuous balling and kneading action which thoroughly mixes the substance and temporarily confines it to a compact mass formation which facilitates continued working of the substance until pliable enough to be received by an applicator.

Another object is the provision of such an applying mechanism which is small and compact so that it may be used as a part of a more elaborate machine such as a container or can bodymaker or the like.

Numerous other objects and advantages of the invention will be apparent as it is better understood from the following description, which, taken in connection with the accompanying drawings, discloses a preferred embodiment thereof.

Referring to the drawings:

Fig. 4 is an exploded perspective view of the applying mechanism, showing its detailed construction;

Fig. 5 is an enlarged horizontal section taken substantially along the line 5—5 in Fig. 3, with parts broken away;

Fig. 6 is a perspective view of a detail shown in section in Fig. 5;

Fig. 7 is a sectional view taken substantially along a plane indicated by the broken line 7—7 in Fig. 6, and Fig. 8 is a side view of the driving elements of the mechanism, as taken substantially along the broken line 8—8 in Fig. 2.

Figure 1:
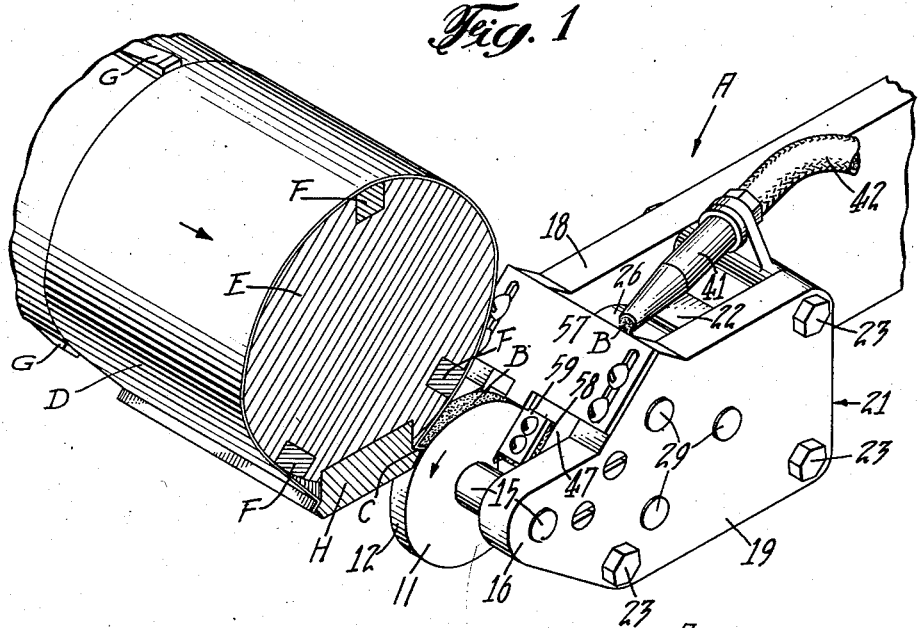
Figure 1 is a perspective view of a portion of a can bodymaker mandrel supporting a partially formed can body and an adjacently disposed compound milling and applying mechanism embodying the instant invention; with parts broken away.

As a preferred or exemplary embodiment of the instant invention the drawings illustrate a milling and applying mechanism A (Fig. 1) for working or conditioning a viscous and thixotropic paste cement B and for applying the worked cement to a side seam hook C of a partially formed sheet metal can body D supported on and propelled along a horizontally disposed mandrel E of a can bodymaker of the character for example, disclosed in United States Patent 1,770,041, issued July 8, 1930, to John F. Peters on Roll Bodymaker, although the invention is equally well adapted for use in connection with other articles and other machines. Stroke bars F carrying feed dogs G and sliding in longitudinal grooves formed in the mandrel are reciprocated in any suitable manner to propel the partially formed can body D along the mandrel. A support block H at the bottom of the mandrel supports the can body hook C during the application of the worked cement B to the hook.

Figure 2:
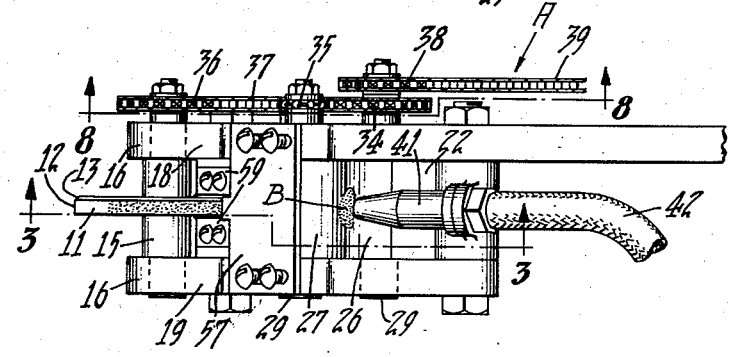
Fig. 2 is a top plan view of the applying mechanism shown in Fig. 1, with parts broken away.

Application of the conditioned cement B to the hook C of the can body D preferably is effected by a rotatable applicator or disc 11 (Figs. 1, 2 and 3) which forms a part of the milling and applying mechanism A. This applicator disc 11 is provided with a smooth narrow peripheral applying face 12 adapted to pick up the conditioned cement B from the milling and applying mechanism and carry it toward the can body D. The face 12 of the applicator disc 11 engages against the edge of the hook C of the body as the body moves along the mandrel and thereby permits the cement to be scraped off the disc and deposited along the length of the hook in a uniform thickness film. A bevel 13 on the edge of the disc 11 initially engaged by the hook C pemits the hook to readily and gradually ride up onto the face 12 of the disc without damaging the hook.

The applicator disc 11 is mounted on a driven shaft 15 (Figs. 1, 2 and 3) which extends across the discharge end of the mechanism and which is parallel with the mandrel E. The ends of the shaft are journaled in a pair of spaced bearings 16 formed in side plates 18, 19 of a three piece housing 21 comprising the side plates and an intervening housing block 22 (see also Fig. 4). The housing block 22 and the two side plates 18, 19, disposed one on each side of the block, are secured together by long bolts 23 which extend through all three pieces to produce a rigid unitary structure. This housing may be attached in any suitable manner to the frame of the can bodymaker or other machine, when the mechanism is used with such machine.

The applicator disc 11 extends into a groove 24 (Figs. 3, 4 and 5) formed in the housing block 22. The width of the groove 24 is substantially the same as the width of the disc 11 to provide a close fit and the bottom of the groove is curved to closely fit against the outer face of the disc.

In the milling and applying mechanism A, the viscous and thixotropic cement B is thoroughly worked or conditioned by being subjected to a kneading or agitating action which rolls and turns the cement continuously while maintaining it in a balled mass, until the cement has been reduced to a sufficiently pliable or semi-fluid state to be readily picked up by the applicator disc 11. This conditioning or working of the cement B is effected by a group of preferably three straight and smooth faced rotatable milling rolls comprising a bottom roll 25 (Figs. 3 and 4) and two top rolls 26, 27 disposed adjacent or behind the applicator disc 11 with their axes in parallelism with each other and in parallelism with the axis of the applicator disc. These milling rolls 25, 26, 27 are mounted in the housing 21, in transverse relation thereto, and are provided with trunnions 29 which are journaled in bearings formed in the housing side plates 18, 19.

Figure 3:
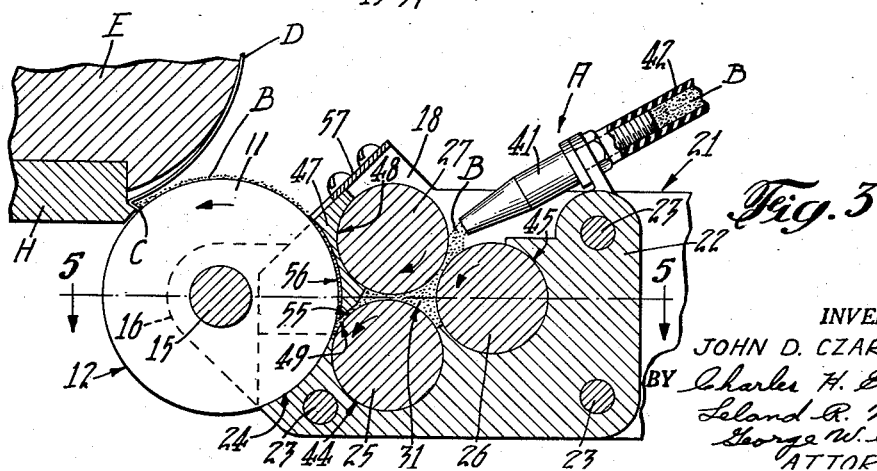
Fig. 3 is an enlarged sectional view taken substantially along the broken line 3—3 in Fig. 2, the view showing a fragmentary portion of the mandrel and the can body shown in Fig. 1.

The milling rolls 25, 26, 27 are arranged in a substantially triangular or V-shaped pattern as best shown in Fig. 3, with their outer peripheries in parallelism and in contiguous relation so as to provide, at a central location between them, an open chamber 31 for receiving and working or conditioning the cement B. These milling rolls are of substantially equal diameters and preferably are made of metal. The rolls are rotated continuously, each at a different speed and in time with the applicator disc 11, the bottom roll 25 and the top roll 26 being rotated in a counterclockwise direction and the top roll 27 being rotated in a clockwise direction (as viewed in Fig. 3). For this purpose the trunnions 29 of the milling rolls 25, 26, 27 and the shaft 15 of the applicator disc 11, extend beyond the housing side plate 18 and carry sprockets 33, 34, 35, 36 respectively (see Figs. 2 and 8) which engage with and are rotated by an endless chain 37. The trunnion 29 of the milling roll 26 serves as a driving trunnion for the entire train of sprockets and for this purpose carries a driving sprocket 38 which is rotated in any suitable manner as by a driving chain 39.

The cement B to be conditioned in the milling and applying mechanism A is fed into the mechanism in any suitable manner so that it is received in the trough between the two top milling rolls 26, 27 as shown in Fig. 3. By way of example, the drawings show a nozzle 41 directed toward the trough and secured to the housing 21 for this purpose, although a hopper or other means could be used if desired. The nozzle 41 is connected to a flexible tube 42 which leads from any suitable supply of the cement. The cement preferably is forced through the tube and nozzle by pressure.

The two top milling rolls 26, 27 rotate inwardly toward the working chamber 31, in opposite directions and hence feed the cement into the chamber. The roll 27 also rotates at a speed approximately twice that of the roll 26 and this causes the cement adjacent the roll 26 to travel slower than the cement adjacent the roll 27 with the result that portions of the cement slide against other portions as in a shearing action. This action is further affected by the roll 25 which rotates in the same direction as the roll 26 but in the opposite direction of the roll 27 and at a speed substantially the same as the speed of the fast rotating roll 27 with the result that the slower traveling cement adjacent the periphery of the slower rotating roll 26 is picked up by the faster rotating roll 25 and is forced upwardly against the fast traveling incoming cement adjacent the periphery of the fast rotating roll 27. This action tends to rotate the cement in the chamber and form it into a ball while thoroughly agitating it and thereby working it to such an extent that its viscosity and thixotropy is greatly reduced.

In order to confine the cement B to the chamber 31 during its conditioning treatment, the bottom roll 25 and the top roll 26 rotate in close fitting recesses 44, 45 (Figs. 3 and 4) respectively, formed in the housing block 22. These recesses 44, 45 are of a diameter substantially equal to the diameter of the milling rolls and are so located in the housing block 22 that the block surrounds substantially two-thirds of the circumference of the rolls, leaving substantially one-third of the circumference adjacent the chamber exposed to the cement B. The edges of the housing block adjacent the recesses 44, 45 serve as scraper blades to prevent the entrance of the cement into the recesses.

Provision is made for turning the cement B inwardly along the milling rolls and toward the center of the chamber 31 to facilitate working of the cement. For this purpose the mechanism is provided with a centering block or element 47 (Figs. 4, 6 and 7) which is interposed between the top milling roller 27 and the applicator disc 11 (see Figs. 3 and 5). This centering block 47 is disposed within the housing 21 with its ends secured to the housing side plates 18, 19.

Adjacent the milling roll 27, the centering block 47 is formed with a curved face 48 which fits closely against the roll as best shown in Fig. 3 and surrounds substantially one-third of its circumference starting at the bottom of the roll (as viewed in Fig. 3) and proceeding in the direction of rotation of the roll. The lower portion of the centering block 47 is further formed with a curved face 49 which fits closely against the bottom milling roll 25 and forms a continuation of the recess 44 in the housing block 22 to completely surround the bottom milling roll 25 except for that portion of its circumference which is adjacent the working chamber 31.

The two curved faces 48, 49 in the centering block 47 set off between them a thin fin or tongue 51 (Figs. 6 and 7) which extends into and substantially fills the narrow space between the bottom milling roll 25 and the top milling roll 27. This fin terminates at a median line drawn through the centers of two rolls and extends along the rolls for their full length. Intermediate its ends the fin 51 is formed with a wide shallow notch 52 the edges of which form a pair of converging or tapered centering guides or guide elements 53 which guide the cement B inwardly away from the ends of the milling rolls and thus tend to keep the cement in a localized area substantially at the center of the working chamber 31. These guide elements 53 also tend to turn the cement back on itself in a lateral direction and thereby facilitate thorough mixing and conditioning of the cement.

The tapered guide elements 53 also direct the conditioned cement B into an outlet channel 55 Figs. 5, 6, and 7 which is formed in the fin 51 at the bottom of the notch 52 and which follows the contour of the bottom milling roll 25 (see also Fig. 3). One end of this channel 55 communicates with the working chamber 31. The opposite end of the channel communicates with the groove 24 in which the applicator disc 11 is located. This end of the channel also communicates with a groove 56 in the centering block 47, the groove 56 providing an upper continuation of the groove 24 for the applicator disc. The bottom of the groove 56 is curved to conform to the contour of the disc but is disposed in spaced relation to the face 12 of the disc.

Hence, the cement B in the working chamber 31 when sufficiently conditioned to flow freely is carried by the milling rolls 25, 27 into the outlet channel 55, through which it advances to the applying face 12 of the rotating applicator disc 11. The disc 11 carries the conditioned cement B on its applying face 12, upwardly through the groove 56 in the centering block 47 as shown in Fig. 3 and applies it to the side seam hook C of the moving can body D as hereinbefore explained.

In order to control the quantity of cement B applied to the can body side seam hook C, an adjustable doctor or scraper blade 57 (Figs. 1, 2 and 4) is disposed adjacent the applying face 12 of the applicator disc 11 in spaced relation thereto to provide for a predetermined thickness of the film of cement carried on the face of the disc. This doctor blade 57 extends across the housing 21 and is adjustably secured to the housing side plates 18, 19 so that it may be adjusted toward and away from the face 12 of the disc 11. Provision is also made to keep the sides of the applicator disc 11 free of the cement. For this purpose a pair of resilient pads 58, preferably made of felt, are disposed one on each side of the disc 11 in engagement therewith adjacent its outer periphery. These pads 58 are held in place by metal plates 59 secured to the back of the centering block 47.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A device for milling viscous substances and for applying the same to articles, comprising in combination a housing, a group of at least three milling rolls arranged in peripherally contiguous relation within said housing and defining between their peripheries a free and unobstructed working chamber for a viscous substance, means for rotating said rolls inwardly toward said working chamber for working a viscous substance received therein to reduce its viscosity, and applicator means adjacent said rolls for receiving said worked substance from said working chamber and for applying it to an article.

2. A device for milling viscous substances and for applying the same to articles, comprising in combination a housing provided with a plurality of cylindrical recesses having predetermined inside diameters, a plurality of milling rolls disposed in said recesses and having outside diameters substantially equal to the inside diameter of said recesses, said rolls being partially confined in said recesses with a peripheral portion of each roll exposed and in contiguous relation to the others and setting off a free and unobstructed working chamber between said peripheral portions and the adjacent portions of said housing, means for feeding said viscous substance into said chamber, means for rotating said rolls inwardly toward said working chamber for working said viscous substance to reduce its viscosity, and applicator means adjacent said rolls for receiving said worked substance from said working chamber and for applying it to an article.

3. A device for milling viscous substances and for applying the same to articles, comprising in combination a group of at least three milling rolls arranged in peripherally contiguous relation and enclosing between their peripheries a working chamber, means for feeding said viscous substance into said chamber, means for rotating said rolls inwardly toward said working chamber for working said viscous substance to reduce its viscosity, centering means disposed adjacent said working chamber for guiding said substance laterally along said rolls and toward the center of said chamber to facilitate working of said substance, and applicator means adjacent said rolls and said centering means for receiving said worked substance from said working chamber and for applying it to an article.

4. A device for milling viscous substances and for applying the same to articles, comprising in combination a group of at least three milling rolls arranged in peripherally contiguous relation and enclosing between their peripheries a working chamber, means for feeding said viscous substance into said chamber, means for rotating said rolls inwardly toward said working chamber for working said viscous substance to reduce its viscosity, applicator means adjacent said rolls for receiving said worked substance from said working chamber and for applying it to an article, and means for controlling the amount of said substance received by said applicator means for application to said article.

5. A device for milling viscous substances and for applying the same to articles, comprising in combination a group of at least three milling rolls arranged in peripherally contiguous relation and enclosing between their peripheries a working chamber, means for feeding said viscous substance into said chamber, means for rotating said rolls inwardly toward said working chamber for working said viscous substance to reduce its viscosity, applicator means adjacent said rolls for receiving said worked substance from said working chamber and for applying it to an article, means adjacent said working chamber for guiding said worked substance to said applicator means, and means for controlling the amount of said substance received by said applicator means for application to said article.

6. A device for milling viscous substances and for applying the same to articles, comprising in combination a housing, a group of at least three milling rolls arranged in peripherally contiguous relation within said housing and defining between their peripheries a free and unobstructed working chamber for a viscous substance, means for rotating said rolls in unison with each roll rotating at a different speed for agitating a viscous substance within said working chamber to reduce the viscosity of the substance, and applicator means adjacent said rolls for receiving said worked substance from said working chamber and for applying it to an article.

7. A device for milling viscous substances and for applying the same to articles, comprising in combination a housing, a group of at least three milling rolls arranged in peripherally contiguous relation within said housing and defining between their peripheries a free and unobstructed working chamber for a viscous substance, means for rotating said rolls inwardly toward said working chamber for working a viscous substance received therein to reduce its viscosity, and a rotatable applicator disc disposed adjacent said rolls for receiving said worked substance from said working chamber and for applying it to an article.

8. A device for milling viscous substances and for applying the same to articles, comprising in combination a group of at least three milling rolls arranged in peripherally contiguous relation and defining between their peripheries a working chamber for a viscous substance, means for rotating said rolls inwardly toward said working chamber for working a viscous substance received therein to reduce its viscosity, a rotatable applicator disc having a smooth peripheral applying face disposed adjacent said rolls for receiving said worked substance from said working chamber and for applying it to an article, an adjustable stationary doctor blade disposed adjacent and movable toward and away from the applying face of said applicator disc for controlling the amount of said substance received by said disc for application to said article, and a pair of resilient pads disposed one on each side of said disc adjacent its peripheral face for cleaning said disc of excess substance.

9. A device for milling viscous substances and for applying the same to articles, comprising in combination a group of at least three milling rolls arranged in peripherally contiguous relation and defining between their peripheries a working chamber for a viscous substance, a housing partially surrounding two of said milling rolls in close conformity with the peripheries of said rolls for confining the portions of said rolls outside of said working chamber to facilitate retention of said substance in said working chamber, a centering block partially surrounding a third milling roll in close conformity with its periphery for cooperation with said housing in retention of said substance in said working chamber, means for rotating said rolls inwardly toward said working chamber for working a viscous substance received therein to reduce its viscosity, and applicator means adjacent said rolls for receiving said worked substance from said working chamber and for aplying it to an article.

10. A device for milling viscous substances and for applying the same to articles, comprising in combination a group of at least three milling rolls arranged in peripherally contiguous relation and defining between their peripheries a working chamber for a viscous substance, means for rotating said rolls inwardly toward said working chamber for working a viscous substance received therein to reduce its viscosity, a centering block having a fin disposed between two of said milling rolls, said fin having a tapered notch setting off guide elements tapered inwardly from the outer ends of said fin toward the center thereof for guiding the substance in said chamber away from the ends of said rolls and for agitating said substance in said chamber, said fin also having a channel communicating with said chamber for the discharge of said worked substance from said chamber, and applicator means adjacent said rolls and in communication with said channel in said fin for receiving said worked substance from said working chamber and for applying it to an article.

References Cited in the file of this patent

UNITED STATES PATENTS

| | | |
|---|---|---|
| 1,822,466 | Valdes | Sept. 8, 1931 |
| 2,046,199 | MacDonald | June 30, 1936 |
| 2,313,751 | Hunter | Mar. 16, 1943 |